US006335514B2

(12) United States Patent
McAmmond et al.

(10) Patent No.: US 6,335,514 B2
(45) Date of Patent: Jan. 1, 2002

(54) SOLDERING ASSEMBLY

(75) Inventors: Matthew J. McAmmond, Auburn Hills; Joseph H. Mickle, Detroit, both of MI (US)

(73) Assignee: Assembly Technologies Int., Inc., Clawson, MI (US)

( * ) Notice: Subject to any disclaimer, the term of this patent is extended or adjusted under 35 U.S.C. 154(b) by 0 days.

(21) Appl. No.: 09/745,632

(22) Filed: Dec. 20, 2000

Related U.S. Application Data (62) Division of application No. 09/313,934, filed on May 18, 1999.

(51) Int. Cl.$^7$ .............................................. H05B 1/00
(52) U.S. Cl. ..................... 219/229; 219/85.16; 219/230; 219/209
(58) Field of Search .................. 219/229, 223, 219/221, 230, 234, 243, 85.16, 85.1, 209, 210; 228/212, 213, 32, 49.1, 49.5, 51

(56) References Cited

U.S. PATENT DOCUMENTS

| | | | | |
|---|---|---|---|---|
| 3,230,338 A | * | 1/1966 | Kawecki | 219/230 |
| 3,576,969 A | * | 5/1971 | Surty | 219/221 |
| 3,650,450 A | * | 3/1972 | Larson et al. | 219/229 |
| 3,889,096 A | * | 6/1975 | Asselman et al. | 219/229 |
| 3,990,863 A | * | 11/1976 | Palmer | 219/221 |
| 4,093,491 A | * | 6/1978 | Whelpton et al. | 219/229 |
| 4,410,874 A | * | 10/1983 | Scapple et al. | 219/209 |
| 4,528,746 A | * | 7/1985 | Yoshimura | 219/229 |
| 4,735,354 A | * | 4/1988 | Yagi et al. | 228/213 |
| 4,822,979 A | * | 4/1989 | DeKam | 219/229 |
| 4,828,162 A | * | 5/1989 | Donner et al. | 228/51 |
| 5,066,844 A | * | 11/1991 | Schuster et al. | 219/230 |
| 5,081,336 A | * | 1/1992 | Schuster et al. | 219/85.16 |
| 5,603,857 A | | 2/1997 | Mickle | |
| 5,645,123 A | * | 7/1997 | Doi et al. | 219/209 |
| 5,683,603 A | * | 11/1997 | Fortune | 219/229 |
| 5,804,795 A | * | 9/1998 | Fortune | 219/229 |
| 5,890,646 A | * | 4/1999 | Tang et al. | 228/49.5 |
| 6,043,457 A | * | 3/2000 | Hashimoto | 219/223 |

OTHER PUBLICATIONS http://www.antaya.com, May 6, 1999, 1 page.
http://www.antaya.com/facility.htm, May 6, 1999, 1 page.
Q–box, Control & Data, http://www.antaya.com/antaya.htm, May 6, 1999, 1 page.
http://www.antaya.com/sales.htm, May 6, 1999, 1 page.
Welcome to Glass Digest, http://www.ashlee.com/GlassDigest, May 6, 1999, 1 page.
Antaya Parts Catalog, http://www.antaya.com/dbase/partslist.asp, May 6, 1999, 8 pages.
Antaya Parts Catalog Form, http://www.antaya.com/dbase/partsForm.asp, May 6, 1999, 2 pages.
Luma Electric Co., Etchtools, Designed to Government Specifications, http://www.lumaelectricco.com/etchtools.html, May 6, 1999, 2 pages.
Luma Electric Co., Etchtools, Ultimate in Electric Marking, http://www.lumaelectricco.com/etchtools2.html, May 6, 1999, 2 pages.
Luma Electric Co., Combination Etchtools and Demagnetizers, http://www.lumaelectricco.com/ed.html, May 6, 1999, 2 pages.
Luma Electric Co., Demagnetizers, Efficient–Dependable–Continuous Use http://www.lumaelectricco.com/demag.html, May 6, 1999, 2 pages.

(List continued on next page.)

*Primary Examiner*—Teresa Walberg
*Assistant Examiner*—Fadi H. Dahbour
(74) *Attorney, Agent, or Firm*—Assembly Technologies International Inc.

(57) ABSTRACT

A solder assembly 10 which is selectively and operably connectable to a controller 12 and which has several "guns" 74, 76 which each allow for the selective creation of a several circuits, thereby allowing for the creation of substantial even solder connections.

4 Claims, 5 Drawing Sheets

OTHER PUBLICATIONS

Methode Electronics, Inc., http://www.methode.com, May 6, 1999, 2 pages.

Welcome to Methode Electronics Automotive Electronic Controls, http://www.methode.com/carthage, May 6, 1999, 1 page.

Welcome to Methode Electronics Network Bus Products, http://www.methode.com/netbus, May 6, 1999, 1 page.

Welcome to Hexacon Electric Company, Quality Soldering Products, http://www.hexaconelectric.com/home.html, May 6, 1999, 1 page.

Hexacon's Commitment to Excellence, http://www.hexaconelectric.com/hex info.html, May 6, 1999, 1 page.

Hexacon Directory, http://hexaconelectric.com/directory.html, May 6, 1999, 1 page.

Hexacon in the News, http://www.hexaconelectric.com/wutz new.html, May 6, 1999, 8 pages.

HEX–WIK Samples are free, http://www.hexaconelectric.com/Hex–Wik.html, May 6, 1999, 1 page.

Luma Electric Company, http://www.lumaelectricco.com, May 6, 1999, 2 pages.

Luma Electric Co., Precision Tools for Production Work, http://www.lumaelectricco.com/soldering.html, May 6, 1999, 2 pages.

Luma Electric Co., Untitled Document http://www.electric-co.com/soldering1.html, May 6, 199, 2 pages.

Luma Electric Co., Soldering Power Units, Powerful–Economical–Flexible http://www.lumaelectricco.com/soldering2.html, May 6, 1999, 2 pages.

Luma Electric Co., Soldering Power Units, Heavy Duty–Efficient–Dependable, http://www.lumaelectricco.com/soldering3.html, May 6, 1999, 2 pages.

Luma Electric Co., Accessory and Maintenance Items, http://www.lumaelectricco.com/access.html, May 6, 1999, 2 pages.

Q–box Control & Data, Our Proprietary Q–box.

* cited by examiner

SOLDERING ASSEMBLY

This application is a continuation of copending application Ser. No. 09/313,934 filed on May 18, 1999.

FIELD OF THE INVENTION

This invention generally relates to a soldering assembly and more particularly, to a soldering assembly having a selectively heatable handset which allows for the selective creation of several electrical circuits which cooperatively and selectively create desirable solder connections.

BACKGROUND OF THE INVENTION

Soldering assemblies are typically used to selectively heat solder which resides upon and/or engages and/or resides within close proximity to one or more electrical components, thereby allowing the heated solder to selectively flow onto the components and to thereafter harden, effective to selectively and electrically connect these components to other components and/or to some other type of electrical assembly, such as and without limitation, a circuit board and/or one or more electrical busses.

These solder assemblies typically include a pair of selectively energizable and/or heatable electrodes which are typically and selectively coupled to a source of electrical power and which are typically adapted to selectively engage each of the components and/or solder and heat the engaged components and/or solder for a certain duration of time, thereby allowing the solder to desirably flow in the previously delineated manner. The electrodes are then removed from engagement with the components and/or deenergized, thus allowing the solder to cool and to create and maintain the desired soldered electrical connection. While these electrodes and prior soldering assemblies do allow for the selective creation of the desired soldered electrical connections, they suffer from some drawbacks.

By way of example and without limitation, these prior dual electrode soldering assemblies oftentimes provide a relatively "uneven flow" of solder due to resistive variances associated with each of the respective heated electrodes, thus causing the electrodes to heat unevenly. These electrode variances, for example, arise from variances associated with the material used to form the respective electrodes as well as to uneven wear caused by the continual and/or repeated engagement of these electrodes with the various components and/or solder. Particularly, the undesirable and "uneven flow" of solder causes a certain portion of the created solder connection to have a relatively large amount of solder while causing the remaining portions to have relatively smaller amounts of solder. Importantly, these asymmetrical solder connections are prone to fatigue type failure, especially in those respective "solder deprived" portions and do not provide reliable and desired electrical connectivity between the various soldered components and the other components/ assembly to which they are respectively connected. Moreover, correction of these uneven solder deposits requires a relatively large amount of operator time, thereby undesirably increasing the overall cost of producing the soldered assembly or product. Additionally, and by way of a second non-limiting example, these prior "dual electrode" soldering assemblies require a relatively large amount of time for each electrode to become operatively energized or "hot", thereby potentially damaging component support surfaces, such as automobile glass, which are relatively sensitive to overheating and which requires the solder assembly to provide relatively high amounts of heat for a rather limited duration of time rather than relatively low amounts of heat applied for a relatively long duration of time.

Moreover, yet another non-limiting drawback associated with these prior assemblies arises from their respective failure to allow the components to be easily and fixedly positioned upon the desired component or assembly that they are to be electrically attached or "soldered to", thereby requiring the operator to simultaneously, and oftentimes manually, fixedly position the component while attempting to create the desired solder connection (e.g. holding the component in a steady manner in one hand and placing the solder assembly in the other hand). This required and undesirable practice unduly complicates the soldering process in a manner which increases the overall amount of time and effort required from the operator and undesirably increases the overall cost of manufacturing or production. The manual placement limitation further increases the probability of operator error due to undesired and/or errant movement of the component, and/or the creation of undesirable solder connections due to undesired and/or errant movement of the soldering assembly.

There is therefore a need for a new and improved soldering assembly which overcomes at least some of the previously delineated drawbacks associated with such prior soldering assemblies and which allows a component to be selectively and solderably connected to another component or assembly in a relative efficient and desired manner.

SUMMARY OF THE INVENTION

It is a first object of the invention to provide a soldering assembly which overcomes at least some of the disadvantages and/or drawbacks associated with prior soldering assemblies and which allows a component to be selectively soldered in a desired manner.

It is a second object of the invention to provide a soldering assembly which overcomes at least some of the disadvantages and/or drawbacks associated with prior soldering assemblies and which selectively and fixedly secures a component while concomitantly soldering the secured component in a selected and desired manner.

According to a first aspect of the present invention a soldering assembly is provided for use in combination with a source of electrical power. Particularly, the source of electrical power provides an electrical power signal and an electrical ground (e.g. in direct current type embodiments) and/or common signal (e.g. in alternating current type embodiments). The soldering assembly includes a hand-held portion having a pair of substantially identical electrodes which are selectively coupled to the electrical power signal and a third contact which is coupled to the electrical common or ground signal.

According to a second aspect of the present invention, a soldering assembly is provided for use in combination with a source of electrical power which produces an electrical power signal and an electrical ground and/or common signal. Particularly, the soldering assembly includes a hand-held portion having a pair of substantially identical contact members which are coupled to the electrical ground and/or common signal and an electrode which is coupled to the electrical power signal and which cooperates with the pair of substantially identical contact members which are coupled to the electrical ground and/or common signal in order to selectively create several electrical circuits which allow a component to be selectively soldered in a desired manner.

According to a third aspect of the present invention, a soldering assembly is provided. Particularly, the soldering assembly includes a hand-held portion having at least one electrode which is adapted to be selectively heated and further including an aperture which is adapted to fixedly and selectively secure a component, thereby allowing the fixedly secured component to be soldered by the selective heating of the at least one electrode.

These and other features, advantages, characteristics of the invention will become apparent from a reading of the following description in combination with the following and included drawings.

DESCRIPTION OF THE PREFERRED EMBODIMENT OF THE INVENTION

Figure 1:
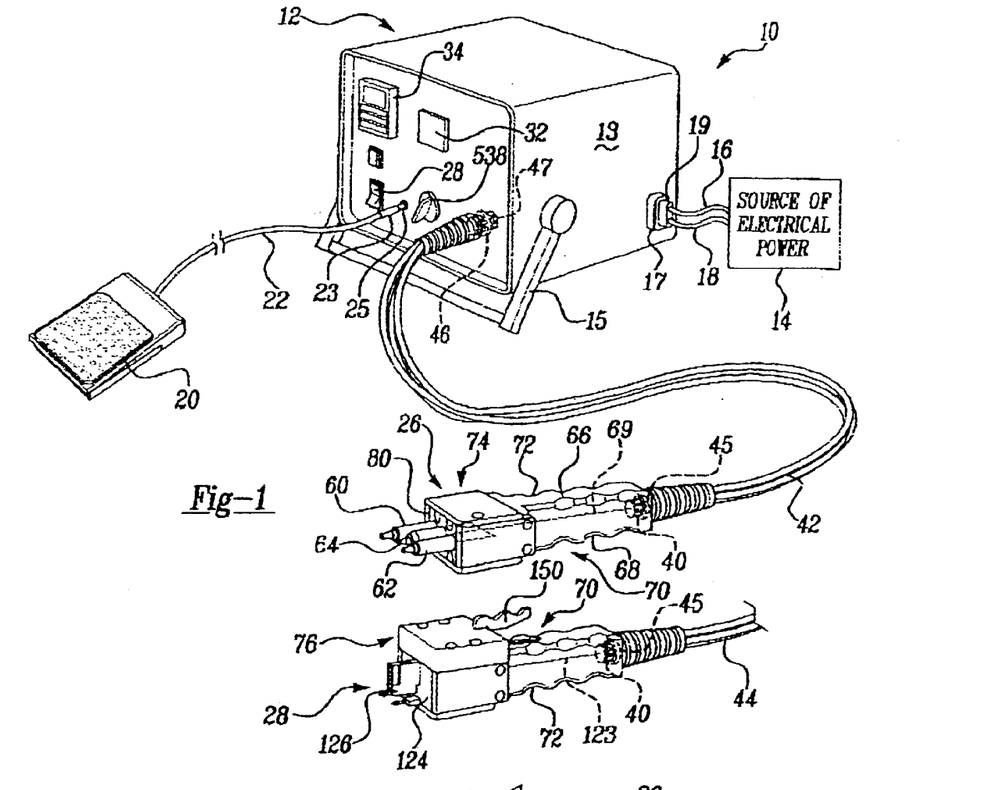
FIG. 1 is perspective view of a soldering assembly made in accordance with the teachings of the preferred embodiment of the invention.
Figure 11:
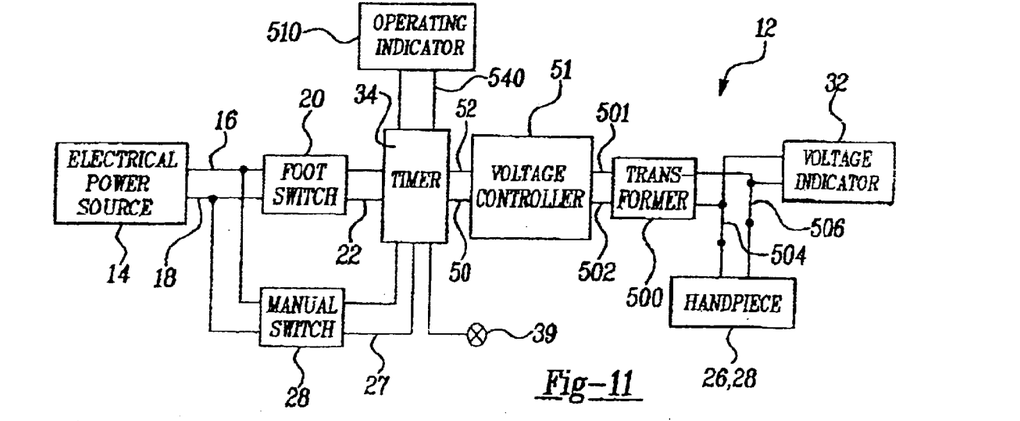
FIG. 11 is an electrical schematic diagram of the assembly shown in FIG. 1.

Referring now to Figures 1 and 11, there is shown a soldering assembly 10 made in accordance with the teachings of the preferred embodiment of the invention. As shown, assembly 10 includes a controller 12 which is operably housed within a portable enclosure 13 having a selectively movable handle 15 which allows assembly 10 to be easily moved and/or transported. Moreover, controller 12, as shown, includes an electrical receptor 17 which is adapted to be selectively and removably coupled to a complementary receptor 19 coupled to a source of electrical power 14. Particularly, receptor 19 is physically and electrically coupled to electrical busses 16 and 18 emanating from a power source or supply 14 and respectively representing an electrical power signal and an electrical ground and/or common signal. If the provided electrical power is of the "direct current" type, bus 18 represent an electrical ground signal bus. If the provided electrical power is of the "alternating current" type, bus 18 represents an electrical common bus. Receptors 17 and 19 therefore cooperatively allow the electrical power and electrical ground and/or common signals, emanating from power source 14, to be selectively, communicatively and removably coupled to the controller 12. It should be realized that complementary connectors 17, 19 may be of virtually any conventional and commercially available configuration and that each bus 16, 18 may have multiple electrical wires.

Controller 12 further includes, in one embodiment of the invention, a manual switch 28 and a foot switch 20 which are each physically and communicatively coupled to busses 16 and 18 and which selectively allow for the communication of the electrical power and electrical ground and/or common signals, respectively provided upon these busses 16, 18, to a conventional and commercially available timer 34 which is also coupled to these switches 20, 28 by respective busses 22, 27 and which is adapted to selectively output these selectively received signals upon respective output busses 50 and 52 for a certain time interval defined or selected by an operator.

In the preferred embodiment of the invention, switch 20 includes a bus 22 having a receptor 23 which may be selectively and operably received by a complementary receptor 25 within controller 12. Complementary receptors 23, 25 may be of virtually any conventional and commercially available configuration and may be respectively and substantially identical to respective connectors 17, 19. Moreover, the time duration of timer 34 may be manually programmed by use of selectively rotatable switch or a "push button" 39 which is coupled to timer 34 and which selectively defines an energization time interval.

Further, controller 12 includes a voltage controller 51 which is coupled to busses 50, 52 and which produces output signals on busses 501, 502 having a certain voltage or power level controlled by adjuster member 538 and which are physically and communicatively coupled to transformer 500. Controller 51 and transformer 500 cooperate to, in one non-limiting embodiment, adjustably and selectively adjust the amplitude and phas of the signals on busses 50, 52 effective to allow selective energization of hand pieces 26, 28 by producing an electrical power signal on bus 504 and an electrical ground or common signal on bus 506, which are coupled to hand pieces 26, 28. In one embodiment, controller 51 comprises a model KBWC-16CLR (MOD) produced by KB Electronics. Controller 12 includes a visual power or voltage indicator 32, which is connected to output busses 504, 506 and which is adapted to selectively and visually display the amount of electrical power or voltage supplied by transformer 500 to the respective hand pieces 26, 28. In one embodiment of the invention, voltage or power indicator 32 is a conventional and commercially available analogue or digital power meter although other types of components may be utilized. Controller 12 also includes a visual operating indicator 510 which is connected to the timer 34 by bus 540 and which provides a visual indication, such as a light of a certain color, or an alphanumerical type display, when electrical power is output from the timer 34. In one non-limiting embodiment, indicator 510 may be integrally formed within timer 34. Additionally, controller 12 also includes two unique "hand pieces" or "soldering guns" 26, 28 which are selectively coupled to busses 504, 506 and which, as is more fully delineated below, become selectively energized and provide and/or create solder connections of a desired and improved type when the timer 34 is activated and is selectively outputting the electrical power and ground and/or common signals upon busses 50, 52 thereby causing the selective production of electrical power signals on bus 504 and electrical ground/common signals on bus 506 by the cooperative arrangement of converter 51 and transformer 500.

Particularly, each member 26, 28 includes a substantially similar generally round and protruding "male type" electrical connector 40 which is adapted to be selectively, removably, and operatively secured within a complementary connector reception cavity 45 formed within and/or physically and operably placed upon each of the respective electrical wire assemblies 42, 44 having and/or including respective busses 504, 506. Moreover, each of the wire assemblies 42, 44 further respectively include a respective protruding "male type" connector 46 which, in one embodiment, is respectively and substantially identical to connector 40, which is adapted to be selectively, removably, and operatively secured within a complementary electrically conductive reception cavity 47 of controller 12, as best shown in FIG. 1, and which is physically and communicatively coupled to the busses 504, 50 contained within wire assembly 42. In this manner, each member 26, 28 may be selectively and operably inserted within the controller 12 in order to allow the selectively inserted member 26, 28 to receive the electrical power and ground and/or common signals respectively present upon busses 504, 506 and to thereafter selectively create several electrical circuits which may be used to selectively create solder connections of a desired type.

As should be appreciated, each connector 40, 46 and respective complementary cavities 45, 47 may be of virtually any desired shape or configuration. In one embodiment of the invention, each connector 40 may have two or more distinct surfaces which respectively couple to one of the electrical power and electrical ground/common signals emanating from the transformer 500 and appearing on busses 504, 506 and selectively appearing on separate and respective portions of each of the cavities 45. Alternatively, connector 40 may represent two or more distinct connective entities which separately are received in two respective and unique cavities and which respectively couple to the electrical power and ground and/or common signals emanating from the transformer 500. In essence, connectors 40, 46 cooperate with respective cavities 45, 47 to allow the electrical power and ground/common signals to be physically and electrically communicated to a respective one of the hand pieces 26, 28. The soldering and/or component fixation operation of assembly 10 will now be delineated in greater detail.

Figure 2:
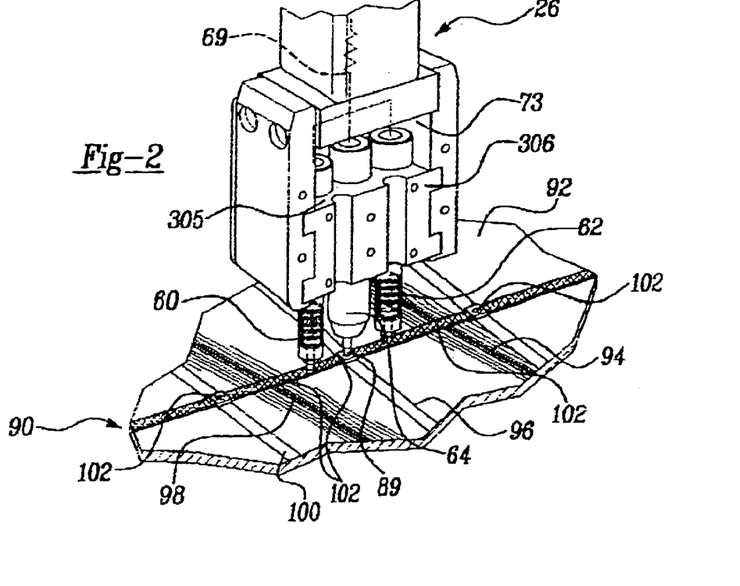
FIG. 2 is a fragmented perspective view of one of the hand-held portions of the assembly of FIG. 1 and shown in operative solder engagement with a solder braid member.
Figure 3:
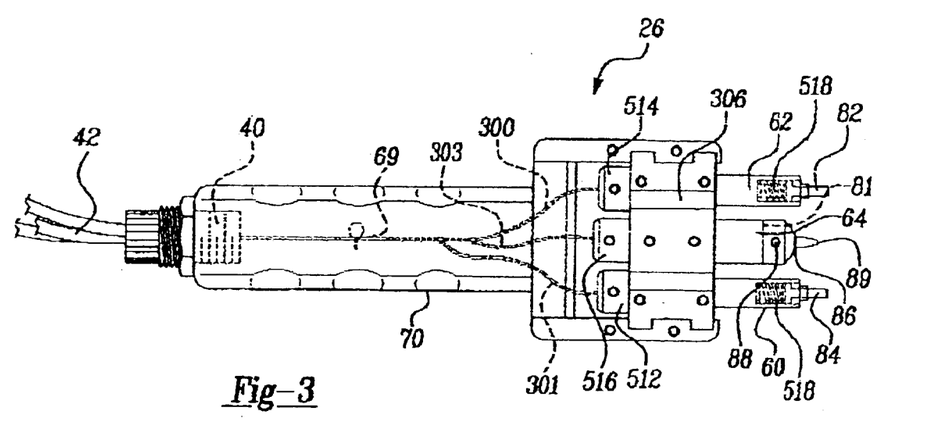
FIG. 3 is bottom view of the hand-held portion shown in FIGS. 1 and 2.

As shown best in FIGS. 1–3, members 26 and 28 each include a substantially identical and generally elongated body 70 having substantially identical and opposed top and bottom "grip" surfaces 66, 68. Each surface 66, 68 includes a plurality of substantially identical ridges 72 which generally conform to the shape and the size of a finger and which cooperatively allow a body 70 to be held within a hand, thereby allowing each of the members 26, 28 to selectively solder a component to another component or assembly in a desired and relatively efficient manner.

Members 26, 28 include respective "head", "gun" or selective energization portions 74, 76 which, in one embodiment of the invention, are integrally formed with and/or form respective body 70 and respectively create an electrode containment cavity 73 which allows for the communication of the electrical power and ground and/ or common signals to the various electrodes 64, 120, 122 and contact members 60, 62 and 126 and for the selective placement of these electrodes 64, 120, 122 and contact members 60, 62, 126 within the respective body 70. In an alternate embodiment of the invention, each portion 74, 76 is selectively removably from the respective body 70. Moreover, each of the members 74, 76 reside and/or are formed upon a certain surface of a respective body 70 opposite from a unique one of the connectors 40. In one non-limiting embodiment of the invention, the longitudinal axis of symmetry of a body 70 also corresponds to and/or overlays the longitudinal axis of symmetry of the respectively installed and/or formed "head" 74, 76 and of the respective conductor 40.

As shown, head 74 includes a pair of generally round and substantially identical contact members 60, 62, protruding from the generally planar surface 80, and which are each coupled to a portion of the connector 40 receiving the electrical ground or common signals existing on bus 506. Member 74 also includes a generally round electrode 64 which also protrudes from surface 80 and which is coupled to the portion of the connector 40 receiving the electrical power signals appearing on the bus 504. Members 60, 62, 64 may be positioned within head 74 by use of set screws or any other type of mechanical and conventional connection members. Similarly, electrodes 120, 122 may also be similarly connected with head 76. Moreover, set screws may be used to position each spring 518 within respective electrodes 60, 62. In one non-limiting embodiment, the set screws contact each respective spring 518 above the contained and respective spring portion.

In one non-limiting embodiment of the invention, these respective transformer output electrical power and electrical ground and/or common signals are communicated to the electrodes 64 and contact members 60, 62 by use of the bus 69 which is resident within body 70 and which has a first and second ground and/or common signal containing wires 300, 301 which terminate on respective terminals 512, 514 and which transfer these received electrical ground and/or common signals to these respective common members 60 and 62. Bus 69 includes a third electrical power containing wire 303 which terminates onto terminal 516 and which transfers the electrical power signal from bus 504 to the electrode 64. The electrode 64 and contact members 60, 62, in one non-limiting embodiment of the invention, are contained within an electrode contact-array 305, which is adapted to be removably placed within cavity 73 and to allow the members 60, 62, and 64 to be operatively positioned as shown. Electrode contact-array 305 also includes an integrally formed non-conductive plate 306 which is secured to body 70 and which substantially ensures that a secure connection may be made between the members 62, 60, 64 and respective terminals 512, 514, 516.

In one embodiment of the invention, each substantially identical generally hollow contact member head 60, 62 telescopingly forms respective and substantially identical round solder/component engagement portions 82, 84 which reside in a similar plane which is perpendicular to the longitudinal axis of symmetry of body 70 and which each contain a substantially similar, conventional, and commercially available "pogo" type pins 518 which cooperatively allow each member 60, 62 to maintain selective component engagement even if the portions 82, 84 become worn due to repeated and prolonged use.

In one embodiment of the invention, the distance separating the respective centers of each portion 82, 84 is about five inches, although other distances and/or dimensions may be utilized depending upon the soldering application to be achieved. Electrode 64, in one embodiment of the invention, includes a cavity 81 into which a generally round and beveled tip member 86, having a pointed conductive tip 89, is selectively received and secured by a conventional pin member 88 and which is constructed of a copper-coated carbon material or some other resistant material which selectively "heats" when receiving electrical power type signals. In one embodiment of the invention, the respective distances between tip 89 and each tip or portion 82, 84 are equal and members 60, 62, 64 all reside in a single plane containing the longitudinal axis of symmetry of body 70.

In operation, as shown best in FIG. 2, a conventional and commercially available solder impregnated braid member 90 is placed upon a surface 92 having several electrically conductive busses 94, 96, 98, and 100 to which the braid member 90 is to be selectively soldered. It should be realized that different numbers or types of busses may be utilized in other applications and that this and the other delineated applications are non-limiting application examples which are included for illustrative purposes only.

The braid 90 typically includes a plurality of substantially identical and distributed solder "pads" 102, each of which is made to contact a unique one of the busses 94–100 as the braid 90 is positioned upon the surface 92. Engagement tip 89 of electrode 64 selectively and separately contacts each of the solder pads 102 while portions 82 and 84 selectively, concomitantly, and separately contact portions of braid 90 on each opposed side of each pad 102 that is being engaged by portion 89. In this manner, portion 86 is energized by the electrical power resident upon bus 504, thereby cooperating with the braid 90 and the contact members 60 and 62 to create two separate current or electrical energization paths; one of the current or energization paths selectively existing along braid 90 between electrode 64 and member 60 while the second current or electrical energization path existing along braid 90 between electrode 64 and member 62. In this manner, upon the selective energization of "gun" 26, two such current energization paths are selectively created substantially each time that portion 64 contacts one of the solder pads 102, thereby allowing the solder, within each pad 102, to evenly flow over the braid 90, along each created current path, and over one of the busses 94–100 ensuring or creating substantially uniform solder connections between the portions 102 of braid 90 and the surface 92, which are superior to the connections produced by prior solder assemblies.

Figure 13:
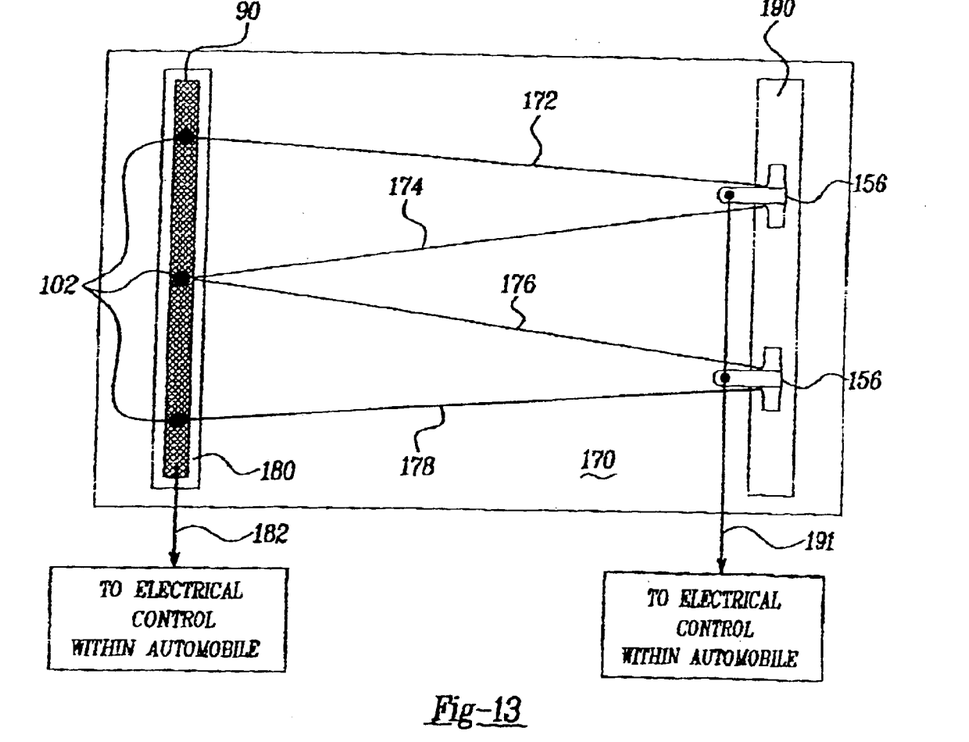
FIG. 13 is a fragmented perspective view of a portion of the glass of an automobile having and/or including an electrical assembly which may be selectively and solderably configured by use of the assembly shown in FIG. 1.

One such solder connection arrangement is shown upon the automobile glass 170 surface of FIG. 13. As shown, glass surface 170 includes several electrically conductive busses 172, 174, 176, and 178 which traverse upon the glass 170 and which are to be electrically and physically coupled to an electrical control apparatus resident within the automobile (not shown) in order to be selectively energized, thereby selectively "de fogging" or "de icing" the glass surface 170.

In this non-limiting embodiment, braid 90 is placed upon a conductive surface 180 which is coupled to the automobile controller by bus 182. Each of the busses 172, 174, 176, 178 are selectively soldered to the braid 90 at solder pad positions 102, in the manner previously discussed, thereby allowing the busses 172, 174, 176, 178 to be selectively energized by the automobile controller in cooperative operation with surface 180 and braid 90. Busses 172–180 may be coupled to another automobile controller or the same controller by use of an alternate embodiment of the invention, as shown within FIG. 13, and to be described later.

As shown best in FIGS. 1 and 4–10 "head" or "gun" member 76 includes two substantially identical, generally rounded electrodes 120, 122 which protrude from surface 124 and which are coupled to the electrical power signals existing on the bus 504. Particularly, each electrode 120, 122 is electrically and physically coupled to a respective and electrically conductive connector member 129, 127 which may be integrally formed within body 70 and which are physically and electrically coupled to the portion of connector 40 receiving these electrical power signals, by use of respective wires 201 and 202 which reside within bus 123 and traversing through and selectively contained within body 70. Members 129, 127 are secured within cavity 73 by plates 352.

Moreover, member 76 further includes a movable generally "L" shaped ground and/or common contact member 126, protruding from surface 124 and physically and electrically coupled to the electrical ground and/or common signals appearing upon bus 506 and which is positioned above the electrode 120, 122 in a plane which perpendicularly intersects the longitudinal axis of symmetry of body 70 and which intersects an axis joining each electrode 120, 122. Particularly, contact member 126 is connected to wire 206, resident within the bus 123 and which is physically and electrically coupled to that portion of connector 40 which receives the electrical ground and/or common signals emanating to and/or existing on the bus 506.

In one embodiment of the invention, each electrode 120, 122 lies in the same plane, which is perpendicular to the axis of symmetry of body 70, and are separated by a distance of about five inches, although other distances may be utilized depending upon the soldering application.

Figure 9:
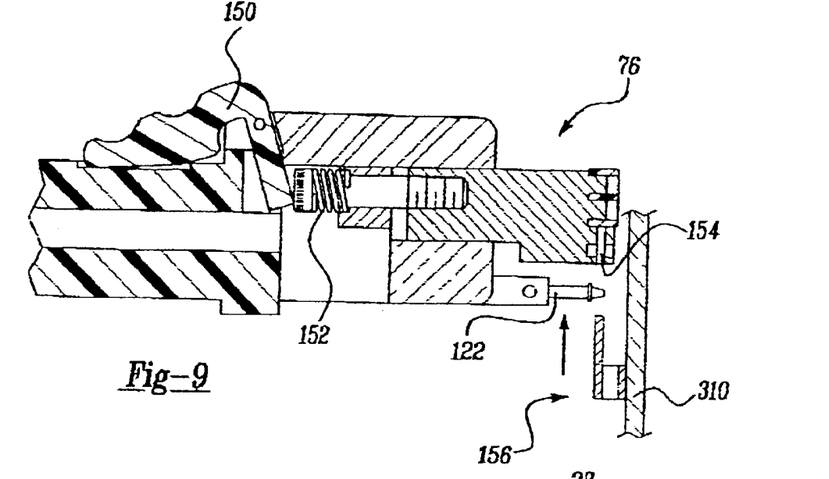
FIG. 9 is view similar to that shown in FIG. 8 but shown in a component disengagement position.
Figure 10:
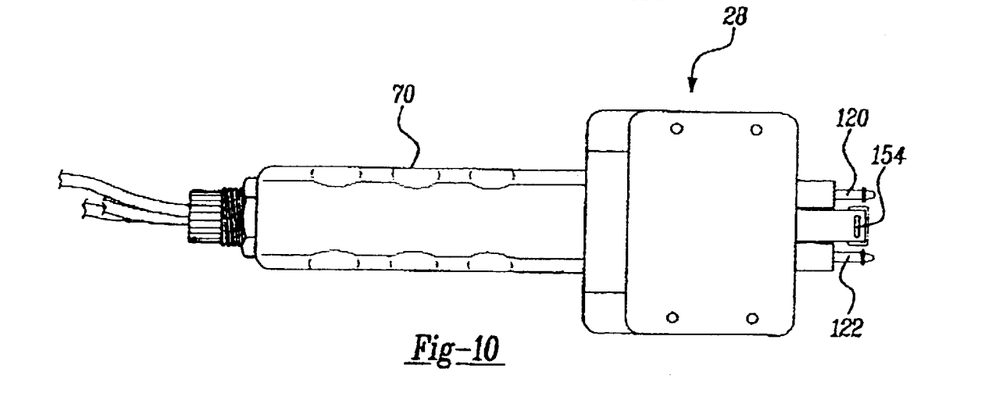
FIG. 10 is a bottom view of the second hand-held portion shown in FIG. 1.

Member 126 further includes a slotted aperture 154 which is adapted to selectively, frictionally, and removably receive a component, such as component 156, and to allow the component to be selectively soldered to a surface 310, in a desired manner. Head or "gun" member 76 further includes a pivotably and movable handle 150 which selectively engages a spring loaded screw assembly 152, resident within the head 76, and which is adapted to cause member 126 to move from a first component engagement position (shown best in FIG. 7) to a second component position (shown best in FIG. 8), in which member 126 selectively applies a certain force or pressure to contained member 156, thereby allowing the component 156 to be selectively released by upwardly moving aperture 154 away from the soldered component 156, as best shown in FIG. 9. As shown best in FIG. 8, component 156 includes substantially identical and generally planar tabs 160, 162, which cooperatively and integrally form a raised tongue portion 164 which is adapted to be frictionally and removably inserted into aperture 154. Other types of components may be utilized by assembly 70. Moreover, spring assembly 152 allows electrodes 120, 122 to maintain respective component contact even after they are worn due to use.

Figure 4:
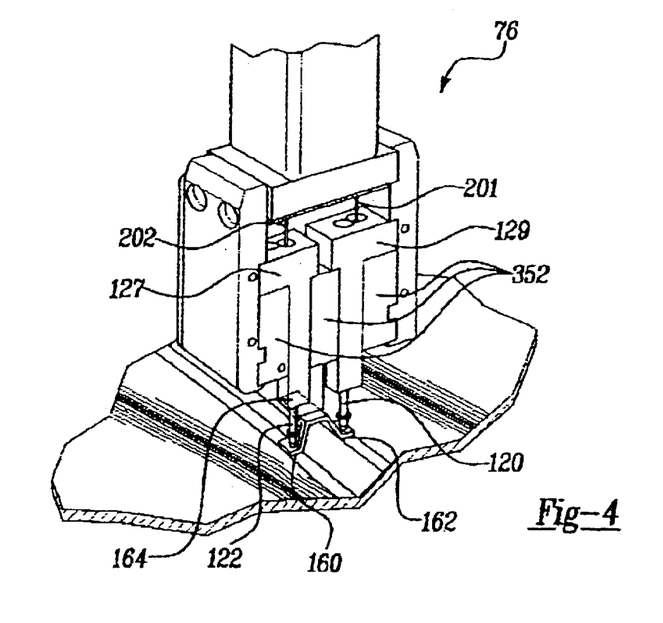
FIG. 4 is a fragmented perspective view of a second of the hand-held portions of the assembly of FIG. 1 and shown in operative solder engagement with an electrical component.
Figure 5:
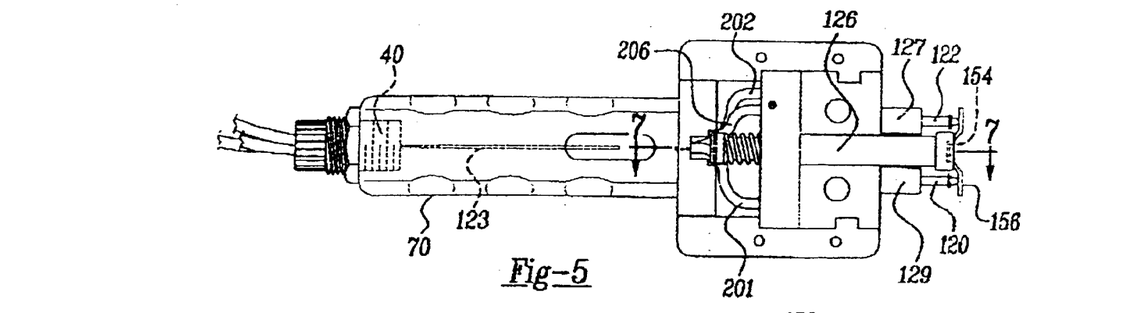
FIG. 5 is a bottom view of the second hand-held portion shown in FIG. 4.
Figure 6:
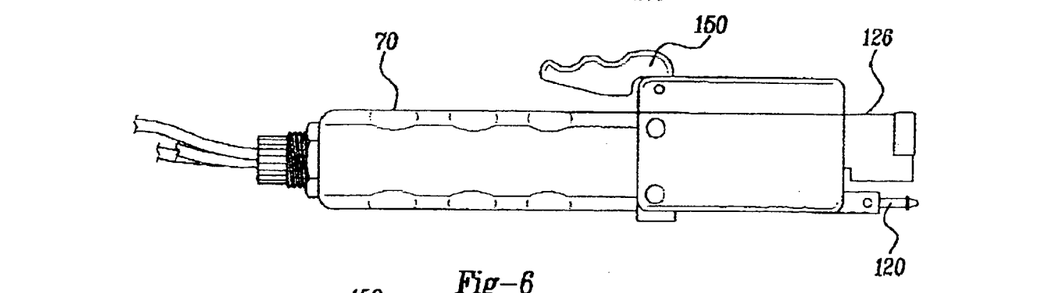
FIG. 6 is a side view of the second hand-held portion shown in FIGS. 4, and 5.
Figure 7:
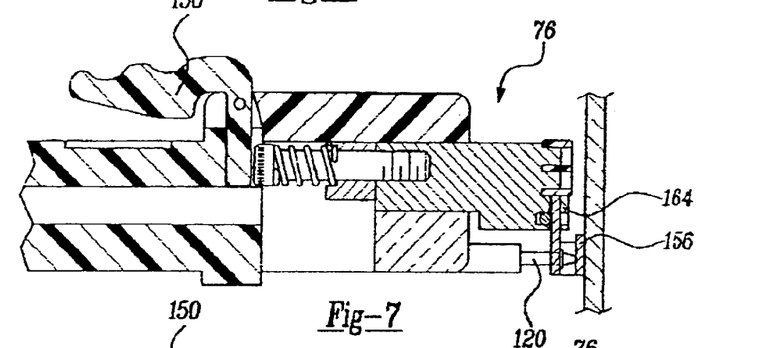
FIG. 7 is a view of the second hand-held portion shown in FIGS. 4, 5, and 6, taken along view line 7—7 and shown in a first handle movement position.
Figure 8:
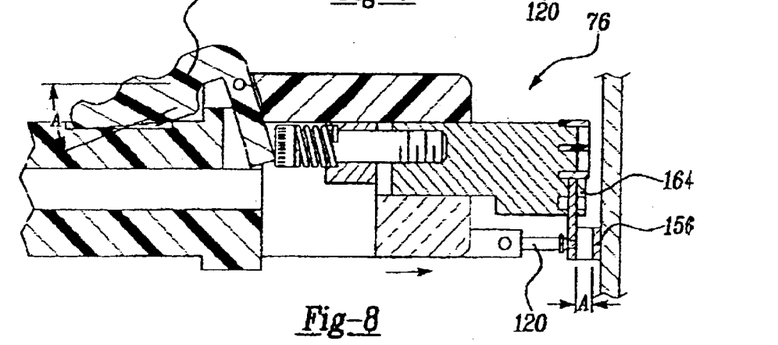
FIG. 8 is a view of the second hand-held portion shown in FIGS. 4, and 5–7, taken along view line 7—7, and shown in a second handle movement position.

In operation, as shown by way of example and without limitation in FIG. 4, tongue 164 is selectively and frictionally inserted within the aperture 154 thereby allowing the operator to properly position and selectively solder the selectively fixated component 156 with a single hand, thereby reducing the probability for error and allowing the overall soldering operation to be relatively efficient. Particularly, each tab portion 160, 162 of the secured component 156 is selectively placed upon a unique one of the electrically conductive busses 160, 162. Energy is applied to the engaged electrodes 120, 122 thereby providing and/or creating two separate circuit paths through component 156; the first of the circuit paths being created between the electrically grounded portion 126 and the energized electrode 122 while the second of these paths is created between the electrically grounded portion 126 and the energized electrode 120. These two distinct circuit paths allow for the solder to flow over each of the tabs 160, 162 in a substantially more even manner than prior solder assemblies. When the solder operation has been completed, the handle 150 is depressed thereby engaging screw assembly 152 and allowing the assembly 24 to be lifted upwards, thereby disengaging the component 156 from the tongue 164, as best shown in FIG. 9.

Figure 12:
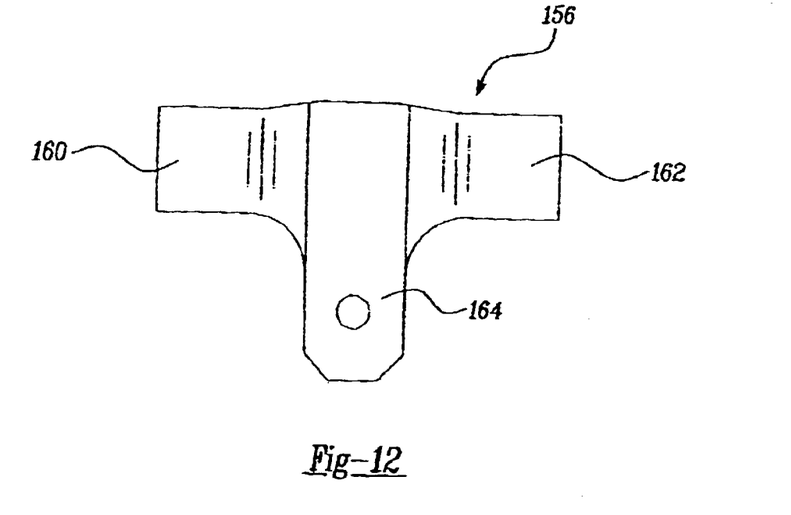
FIG. 12 is a perspective view of one of the components which may be selectively employed by the second hand-held portion shown in FIGS. 4–10.

In one non-limiting application, shown in FIG. 12, assembly 28 may be selectively utilized to solder several of the components 156 upon conductive surface 190 which is substantially similar to the previously delineated electrically conductive surface 180. In this application, each tab 160, 162 of a unique component 156 is soldered to a unique conductive bus 172, 174, 176, 178. The respective component tongue portions 164 are coupled to the automobile controller by use of bus 191.

It is to be understood that the invention is not to be limited to the exact construction and/or method which has been previously delineated, but that various changes and modifications may be made without departing from the spirit and/or the scope of the disclosed inventions.

What is claimed is:

1. A solder assembly comprising a single selectively energized electrode and a plurality of electrically grounded members which selectively cooperate with said single electrode to create a plurality of circuits through a component, effective to allow solder to flow over a first and a second portion of said component.

2. The solder assembly of claim 1 wherein said single selectively energized electrode is disposed between two of said plurality of electrically grounded members.

3. A solder assembly comprising a single selectively energized electrode and a pair of electrically grounded members, said solder assembly having an aperture which selectively and frictionally receives a certain component to be soldered and which further includes a movable spring assembly which allows said received component to be selectively retained within said solder assembly and to be in solder engagement with said single selectively energized electrode and said pair of electrically grounded members, effective to form a pair of circuits through said component.

4. The solder assembly of claim 3 wherein said single selectively energized electrode is disposed between said pair of electrically grounded members.

* * * * *